(12) United States Patent
Feist et al.

(10) Patent No.: US 7,018,572 B2
(45) Date of Patent: Mar. 28, 2006

(54) METHOD FOR PRODUCING DATA STORAGE MEDIA

(75) Inventors: Thomas Paul Feist, Clifton Park, NY (US); Thomas Bert Gorczyca, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 634 days.

(21) Appl. No.: 09/681,817

(22) Filed: Jun. 11, 2001

(65) Prior Publication Data

US 2002/0186649 A1  Dec. 12, 2002

(51) Int. Cl.
*B29D 11/00* (2006.01)

(52) U.S. Cl. ............... 264/1.33; 264/219; 264/328.16; 425/810

(58) Field of Classification Search ............... 264/1.33, 264/219, 328.16; 425/810

See application file for complete search history.

(56) References Cited

U.S. PATENT DOCUMENTS

| | | | |
|---|---|---|---|
| 4,225,109 A | 9/1980 | Yotsutsuji et al. | |
| 4,879,082 A | 11/1989 | Kudo et al. | |

(Continued)

FOREIGN PATENT DOCUMENTS

| | | |
|---|---|---|
| EP | 0 489 335 A1 | 6/1992 |
| EP | 0 640 458 A1 | 3/1995 |
| EP | 0 796 713 A1 | 3/1996 |

(Continued)

OTHER PUBLICATIONS

Japanese Patent No. JP1153263; Publication Date Jun. 15, 1989; "Device for Polishing Back of Optical Disk Molding Stamper"; Abstract Only; 1 page.

(Continued)

*Primary Examiner*—Jill L. Heitbrink
(74) *Attorney, Agent, or Firm*—Shawn A. McClintic; William E. Powell, III

(57) ABSTRACT

Disclosed herein are data storage media and methods of making the same. The data storage media, comprises: primary surface features disposed on at least one side of said data storage media; and secondary features superimposed over at least a portion of said surface features. In one embodiment, the method for manufacturing the data storage media comprises: disposing an identifier layer onto a surface of a stamper, said stamper having primary surface features on a first side of said stamper opposite said identifier layer; forming secondary features on an exposed surface of said identifier layer; installing said stamper into a mold; injecting a molten plastic material into the mold, wherein said molten plastic physically contacts said first side; cooling said plastic to form said data storage media, such that a positive image of said primary surface features and of said secondary features are formed into at least a portion of a surface of said plastic; and releasing said data storage media from said mold.

17 Claims, 4 Drawing Sheets

U.S. PATENT DOCUMENTS

| | | | |
|---|---|---|---|
| 5,041,247 A | 8/1991 | Kim | |
| 5,124,192 A | 6/1992 | Kim et al. | |
| 5,176,839 A | 1/1993 | Kim | |
| 5,288,519 A | 2/1994 | Baumgartner et al. | |
| 5,290,597 A | 3/1994 | Baumgartner et al. | |
| 5,302,467 A | 4/1994 | Baumgartner et al. | |
| 5,324,473 A | 6/1994 | Baresich | |
| 5,388,803 A | 2/1995 | Baumgartner et al. | |
| 5,458,818 A | 10/1995 | Kim et al. | |
| 5,480,763 A * | 1/1996 | Kondo et al. | 430/320 |
| 5,897,814 A | 4/1999 | Niemeyer et al. | |
| 6,099,287 A | 8/2000 | Higashida et al. | 425/190 |
| 6,146,558 A | 11/2000 | Feist et al. | |
| 2002/0081413 A1 * | 6/2002 | DallaVerde | 264/1.33 |

FOREIGN PATENT DOCUMENTS

| | | |
|---|---|---|
| JP | 88-71325 | 9/1986 |
| JP | 87-5824 | 8/1987 |
| JP | 87-180541 | 8/1987 |
| JP | 630 71325 | 3/1988 |
| JP | 11-149673 * | 6/1999 |
| WO | WO 89/10829 | 11/1989 |

OTHER PUBLICATIONS

U. S. Patent Application "Method for Injection Molding of Optical Discs" by Matthew F. Niemeyer, et al., U.S. Appl. No. 08/874,235, filed Jun. 13, 1997.

Matthew F. Niemeyer and Thomas W. Hovatter, "Better Surface Replication for DVD and Recordable Discs Through Managed Heat Transfer", pp. 1-10 & 7 sheets of figures, presented at ITA-MOMS conference Oct. 1996, San Francisco, CA.

DuPont Technical Bulletin "Pyralin Polymide Coatings for Electronics VM-651 and VM-652 Adhesion Promoters", H-73153, effective Jun. 1997, one page.

Matthew F. Niemeyer and Thomas W. Hovatter, "The Application of Managed Heat Transfer to the Production of Higher Quality Optical Discs", GE Plastics Article, pp 1-9 & 7 pages of figures presented at Replitech Conference Jun. 1996 California.

* cited by examiner

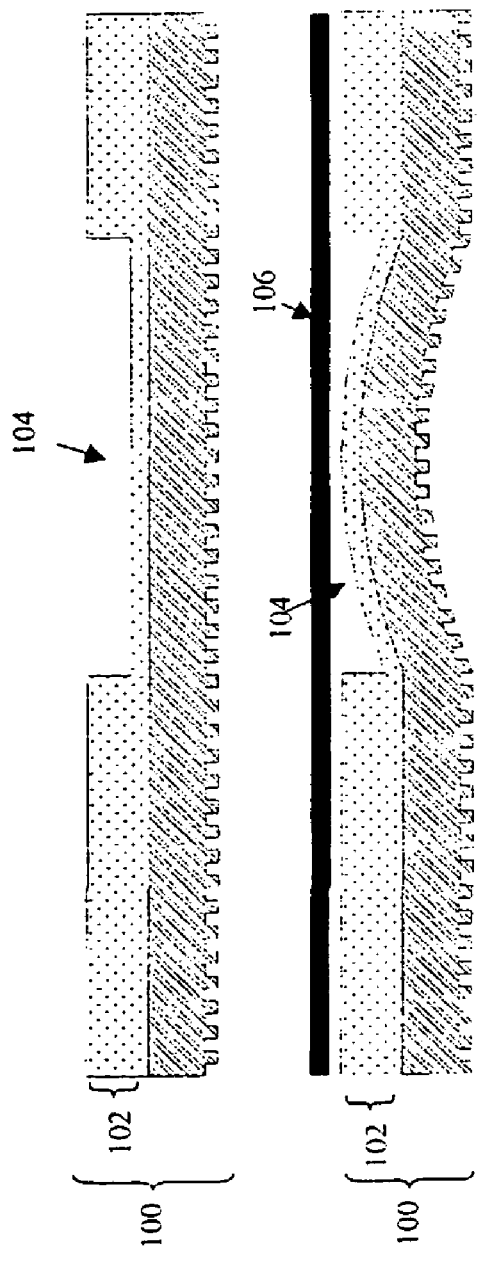

METHOD FOR PRODUCING DATA STORAGE MEDIA

BACKGROUND OF INVENTION

In the production of data storage media, e.g., optical discs, magnetic discs, magneto-optical discs, and the like, such as compact discs (CDs) and digital video discs (DVDs), surface features are created on the disc during an injection molding process. These surface features are typically locators (e.g., pits or grooves) produced by molding a plastic material against a stamper that contains a negative image of the features to be molded. Stampers are typically made by electroplating nickel against a master produced by conventional photolithographic techniques.

Various types of molds have long been in use for preparing optical discs from thermoplastic resins. Molds for these purposes are typically manufactured from metal or a similar material having high thermal conductivity. For most purposes, high thermal conductivity is desirable since it permits the resin in the mold to cool rapidly, shortening the molding cycle time. At times, however, cooling is so rapid that the resin freezes instantaneously at the mold surface upon introduction into the mold, forming a thin solid layer which, especially if is contains a filler, can create rough surfaces, voids, porosity and high levels or residual stress and orientation. In an optical disc, for example, such imperfections impede the optical properties and decrease or eliminate of the performance of the optical disc.

Therefore, in an injection molding of compact discs, for audio, video, or computer data storage and retrieval applications, heat transfer through the mold has a strong effect on molding time and disc attributes such as birefringence, flatness, and accuracy of feature replication.

One method for affecting heat transfer and improving the cycle time during injection molding is known as the technique of managed heat transfer (MHT). The basic principle of managed heat transfer is applying a passive thermal insulating layer to the mold to control the transient heat transfer between molten resin materials and the mold surfaces during the injection molding. The insulating layer comprises materials having both low thermal diffusivity and conductivity, thus slowing the cooling of the molded resin, and good resistance to high temperature degradation, permitting use in a mold maintained at high temperatures. For improving mechanical strength, strong adhesion to the insulating layer, abrasion resistance, oxidation resistance and to better control thermal impedance, at least one skin layer may be bonded to the insulating layer.

SUMMARY OF INVENTION

Disclosed herein are data storage media and methods of making the same. The data storage media, comprises: primary surface features disposed on at least one side of said data storage media; and secondary features superimposed over at least a portion of said surface features, wherein said secondary features do not inhibit readability of said data storage media.

In one embodiment, the method for manufacturing the data storage media comprises: disposing an identifier layer onto a surface of a stamper, said stamper having primary surface features on a first side of said stamper opposite said identifier layer; forming secondary features on an exposed surface of said identifier layer; installing said stamper into a mold; injecting a molten plastic material into the mold, wherein said molten plastic physically contacts said first side; and cooling said plastic to form said data storage media, such that a positive image of said primary surface features and of said secondary features are formed into at least a portion of a surface of said plastic.

The above described and other features are exemplified by the following figures and detailed description.

BRIEF DESCRIPTION OF DRAWINGS

Referring now to the drawings, in which:

FIGS. 2 and 3 are schematic, expanded, cross-sectional views of a CD ROM stamper having a valley patterned managed heat transfer layer;

FIGS. 4 and 5 are schematic, expanded, cross-sectional views of a CD ROM stamper having a peak patterned managed heat transfer layer;

DETAILED DESCRIPTION

Figure 1:
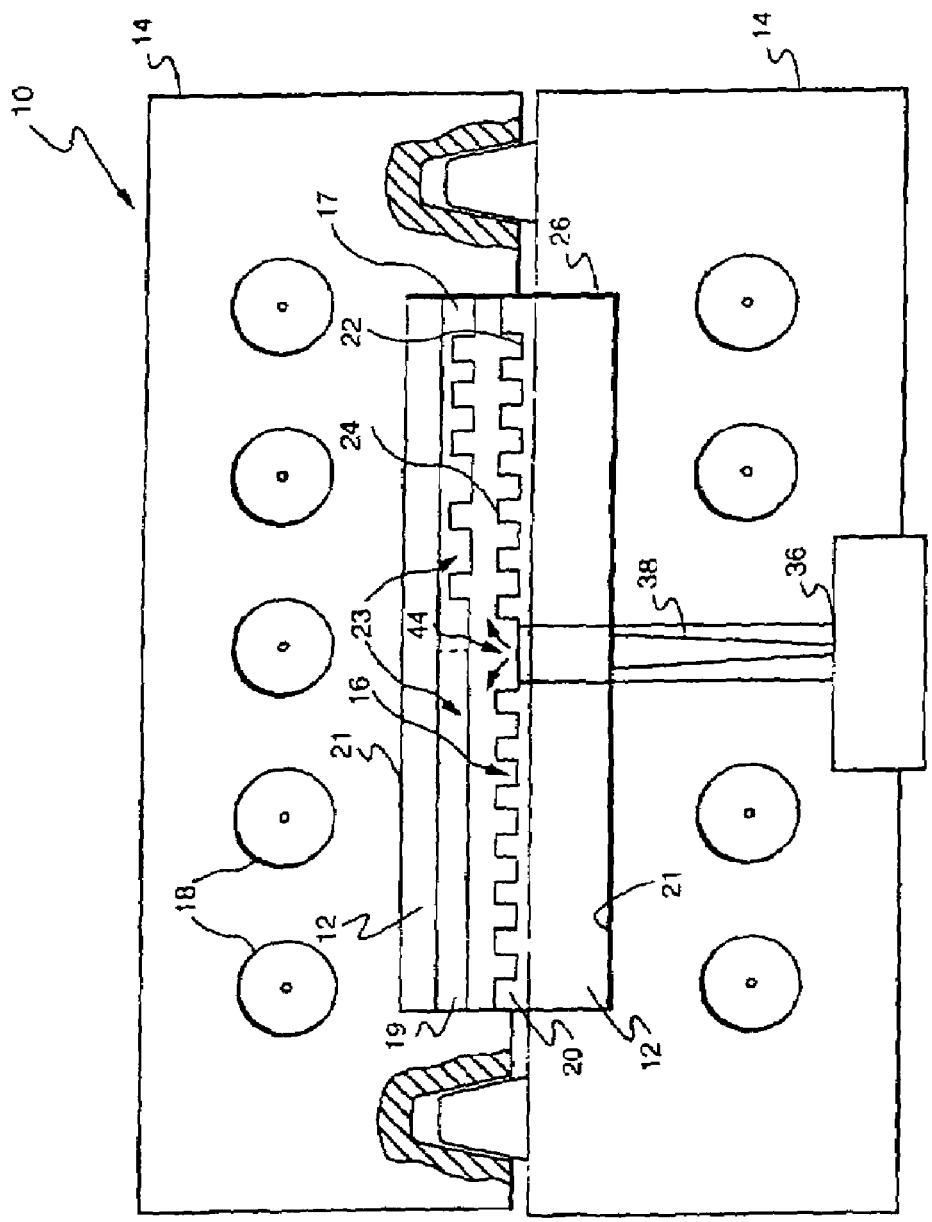
FIG. 1 is a sectional side view of one embodiment of an injection mold.

Unauthorized copying of music, videos, computer data, and the like is a serious problem that is difficult to detect and address. Source identification of data storage media is preferred. However, such identification is preferably, itself, difficult to replicate. Microscopic and/or macroscopic identifiers can serve as aesthetic and/or source identification purposes. These identifiers are produced by disposing secondary features on the identifier layer disposed on the second side (back side) of the stamper (e.g., the back surface of the stamper itself, a managed heat transfer layer, and/or any plastic layer). Surface (or primary) features (e.g., pits, groves, edge features, and the like) are disposed on the face of master (e.g., a nickel plated stamper). With the secondary features disposed in the identifier layer on a side opposite the face of the stamper, when the stamper is employed to produce a data storage media, the surface features are imparted to the surface of the media, and the secondary features are superimposed over part, or all, of the same surface of the media.

The secondary features can be formed on the identifier layer using any technique capable of forming features in the surface of a plastic substrate. Some possible techniques include using laser ablation, embossing, photolithography, etching, and the like, as well as combinations comprising at least one of the foregoing methods.

For example, the identifier layer can be disposed on the stamper, e.g., via spin coating, bonding, laminating, vapor deposition, spraying, sputtering, and the like. A pattern is then formed on the exposed surface of the layer using a laser system. The laser system removes a controlled thickness of the layer in a specified area of the stamper. For a polyimide layer, for example, an excimer laser beam having a wavelength of about 248 nanometers (nm) to about 308 nm can be used. The preferred wavelength is dependent upon the type of material employed as the identifier layer. Also, by controlling the laser power and pulse number, the depth of the ablation of the identifier layer can be adjusted. For example, a KrF (248 nm wavelength) excimer laser operating at 200 millijoule power ablates approximately 70 nm thickness of a polyimide identifier layer per pulse.

Alternatively, plasma etching in an oxygen atmosphere can be used for forming a pattern in the identifier layer. A metal mask can be applied over the identifier layer for a pattern transfer. The metal mask can be integrated with the identifier layer; i.e., the metal mask can be sputtered directly on the identifier layer and the identifier layer can be patterned using photo patterning techniques. A pattern can also be formed using photolithography. For example, a photosensitive polyimide material can be coated, and subsequently patterned using a standard photo patterning process known in the art.

The identifier layer can be in the form of a single layer or multilayer structure and can comprise any material capable of withstanding the molding conditions and capable of adhering to the stamper. Possible materials include plastics, ceramics, glasses, metals, as well as alloys, cermets, composites, and combinations comprising at least one of the foregoing materials. Possible metals include titanium, aluminum, chrome, nickel, gold, and copper. Possible ceramics include silicon dioxide, silicon nitride, alumina, silicon carbide and aluminum nitride. Possible plastics include amorphous, crystalline, and/or semicrystalline materials and reaction products and combinations comprising at least one of the foregoing materials. For example the plastic can comprise: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene fluorocarbon polymers (e.g., Teflons). The plastic may also or alternatively comprise thermosetting resins such as epoxy, phenolic, alkyds, polyester, polyimide, polyurethane, mineral filled silicone, bis-maleimides, cyanate esters, vinyl, and benzocyclobutene resins. Additionally, the plastic may comprise blends, copolymers, mixtures, reaction products and composites comprising at least one of the foregoing thermoplastics and/or thermosets.

Preferably, the identifier layer is a managed heat transfer layer fabricated from low thermally conductive materials such as high temperature thermoplastic materials, thermoset materials, plastic composites, porous metals, ceramics and low-conductivity metal alloys. Typical plastics useful for forming the identifier layer comprise polyimides, polyamideimides, polyamides, polysulfone, polyethersulfone, polytetrafluoroethylene, and polyetherketone, as well as blends, copolymers, mixtures, reaction products and composites comprising at least one of the foregoing plastics. For example, a plastic can be applied in uncured form (e.g., as a polyamic acid in the case of a polyimide or polyamide-imide) and subsequently heat cured, or in a polymerized plastic can be solvent cast (e.g., the plastic is dissolved in a solvent, applied to the stamper, and subsequently the solvent is removed). Preferably, the identifier layer is flexible film such as a polyimide film manufactured under the trademark KAPTON (commercially available from E.I. du Pont de Nemours and Company).

The identifier layer can have a thickness sufficient to contain the desired secondary surface features, and optionally to perform the desired managed heat transfer. The depth of the secondary surface features, however, can vary from less than or equal to about 1 micrometer ($\mu$m) up to a depth of the combined thickness of the identifier layer and the managed heat transfer layer. The identifier layer and the managed heat transfer layer can be one and the same, in which case the secondary surface features are "scribed" into the managed heat transfer layer. Generally, the thickness of the layer is greater than about 1 mil (0.0254 millimeters (mm)), with greater than about 2 mils (0.0508 mm) preferred, and greater than about 2.5 mils (0.0635 mm) more preferred. It is further preferred to have a thickness of less than about 20 mils (0.508 mm), with less than about 15 mils (0.381 mm) more preferred.

In addition to the above materials, the identifier layer can comprise fillers. The fillers should have a size and geometry that does not interfere with the primary and secondary surface features. Some possible filler include glass, aluminum silicate ($AlSiO_3$), barium sulfate ($BaSO_4$), alumina ($Al_2O_3$), and the like, or a layer of filled polyimide resin coated with a layer of non-filled polyimide resin, as well as combinations and layers, comprising at least one of the foregoing fillers.

With respect to secondary feature dimensions, the desired effect, in combination with the size of the primary surface features, dictates the preferred range. The width and valley depth or width and peak height will effect the amount of translation seen on the storage media (e.g., optical disk, and the like), which must be chosen such that the superimposing of both patterns (primary and secondary) will not interfere with the ability to read data from the media. Therefore, secondary feature dimensions translated to the molded disk can be controlled by both width, length, height (for peaks) and depth (for valleys) of the pattern put into the identifier (and/or managed heat transfer) layer, as well as the thickness of the Ni stamper that effects its stiffness.

For microscopic features, the secondary features can have a depth of about greater than or equal to about 0.05 $\mu$m, measured from the plane of the top most layer to the valley of the etched pattern. A microscopic feature depth of less than or equal to about 5.0 $\mu$m is preferred, measured from the plane of the top most layer to the valley of the etched pattern. For macroscopic features, the secondary features can have a depth of greater than about 5.0 $\mu$m up to a depth of the combined thickness of the identifier layer and the managed heat transfer layer.

Since the horizontal dimensions of secondary (valley) features affect translation of the secondary pattern to the molded plastic disk, i.e., very narrow or short (valley) features (e.g., for a nickel stamper having a thickness of about 280 micrometers ($\mu$m) or greater and pressed against a mirror block) valley features having a width of less than about 25 $\mu$m will not translate to the molded storage media due to the stiffness of the Ni stamper. Under such conditions, the stamper prevents deformation over a narrow feature resulting in the primary feature "bridging" over the secondary patterned feature. In contrast, very short or narrow peak areas (e.g., for a nickel stamper having a thickness of about 300 micrometers or less and pressed against a mirror block a peak width greater than or equal to about 1 $\mu$m) will transcribe to the molded disk. Consequently, although the specific peak and valley widths are dependent upon the stiffness of the stamper, secondary valley features equal to or greater than about 25 μm in width and secondary peak features greater than or equal to about 1 μm can be employed, with secondary valley features having a width greater than or equal to about 30 μm and secondary peak features having a width greater than or equal to about 5 μm are preferred, and secondary valley features having a width greater than or equal to about 50 μm and secondary peak features having a width greater than or equal to about 10 μm are especially preferred.

The primary features generally have a depth of up to about 200 nm, with a depth of about 50 nm to about 200 nm preferred. These features are on the stamper front-side and are in direct contact with the plastic being molded. The transition for these features from peak to valley is very sharp, occurring in a length of approximately 100 nanometers or less in the molded article (e.g., the optical disc). Superposition of the secondary peak to valley features onto the primary features in the molded article is much less abrupt, occurring over an area of up to 100 micrometers or more. This difference prevents the secondary features from interfering with the playback or reading of the primary bits or features. Therefore, the pattern to be formed on the media by the secondary features can be distinguished from the primary features without adversely effecting information stored in the media.

The stamper can comprise any material compatible with the injection molding process, containing surface features, and possessing sufficient structural integrity to enable repeated use as a stamper. Typically the stamper is electroplated nickel, however, other metals and/or alloys can be employed.

Referring to FIG. 1, a sectional side view of a molding system employing the stamper comprising microfeatures is illustrated. An injection mold 10, including a thermally insulative identifier layer 12 and a pair of mold halves 14 of high thermally conductive material, form a mold cavity 16. Thermally insulative is meant to include materials having coefficients of thermal conductivity less than or equal to about 50 watts per meter Kelvin (W/m·K). Thermally conductive is meant to include materials having coefficients of thermal conductivity greater than or equal to about 100 W/m·K.

Cooling lines 18, such as copper pipes and the like, are preferably provided in each mold half 14 for receiving a cooling fluid to reduce cycle time. At least one data storage media stamper 20 is positioned and secured in the mold cavity 16. The stamper 20 has a grooved or pitted surface (face) 22 carrying information. If desired, a second stamper 23 can additionally be positioned in mold cavity 16. For purposes of example, a smooth surface of the stamper is represented by portion 19 and a grooved or pitted surface of the stamper for carrying information is represented by portion 17.

Hot plastic 44 can be injected into the mold cavity 16 via a sprue bushing 36 and a sprue 38. Various plastics may be used to form the media, such as those described above.

Heat from the plastic 44 is absorbed through the stamper 20. The identifier layer preferably prevents quick cooling of the plastic 44, regulating heat transfer. This results in a hot plastic surface at the interface between the stamper 20 and the plastic 44 for a short time period. The identifier layer 12 and the stamper 20 cooperate to provide the desired surface quality to the produced discs.

Referring to FIGS. 2 through 5, schematic cross-sectional views of CD ROM stampers 100 having valley 104 (FIGS. 2 and 3) and peak 108 (FIGS. 4 and 5) patterned managed heat transfer layers 102 are illustrated. In FIG. 2, the managed heat transfer layer 102 is patterned with a valley section 104. Positioning this stamper 100 against a mirror block 106 and injecting resin into the mold cavity will cause deformation of the stamper 100 towards the mirror block 106 in the valley section 104, which will result in a raised area forming on the molded sample. (See FIG. 3) FIG. 4 illustrates a peak area 108 patterned on the managed heat transfer layer 102. Positioning this stamper 100 against a mirror block 106 in the mold equipment and injecting resin into the mold cavity will result in a depressed or dimpled area on the molded part surface. (See FIG. 5) In both cases, the secondary features on the molded substrate are superimposed over the primary feature pattern and do not interfere with playback or reading of the primary features.

Figure 6:
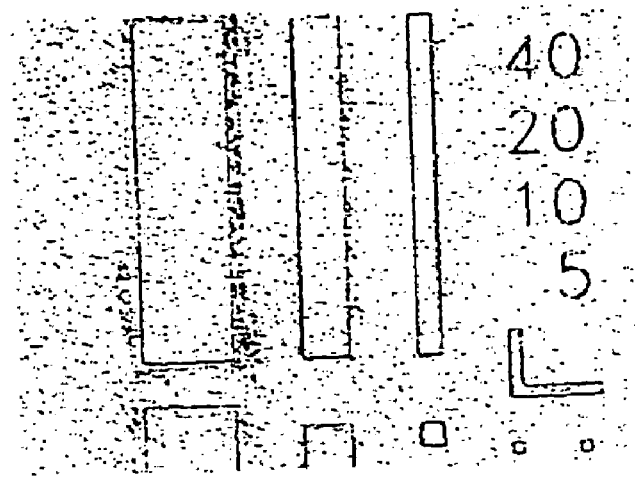
FIG. 6 illustrates a pattern produced on an identifier layer of a stamper.

FIG. 6 illustrates a pattern produced on an identifier layer of a stamper using a laser system at a wavelength of 248 nm. This pattern was repeatedly formed at different areas with varied depth. The patterning condition was as follows: ablation pattern with line widths of approximately 30 mils (0.762 mm), 15 mils (0.381 mm), 8 mils (0.203 mm), and 4 mils (0.102 mm) 40 pulses attained a depth of 3.3 micrometers (μm) and 120 pulses attained a depth of 9.3 μm, determined by profilometry.

Figure 7:
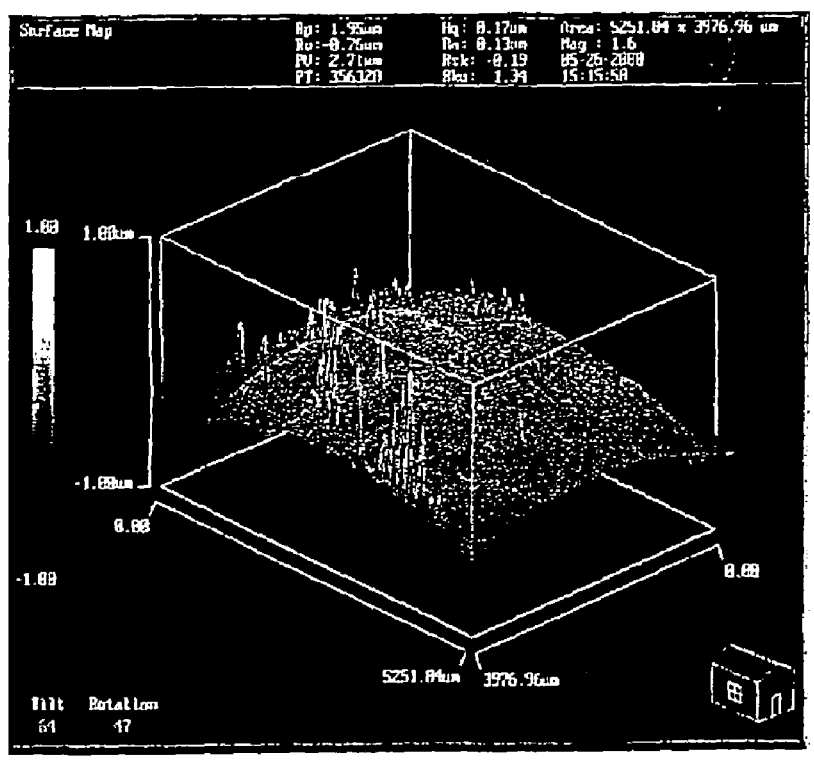
FIGS. 7 and 8 illustrate optical profilometer images of the features produced on a disc molded.
Figure 8:
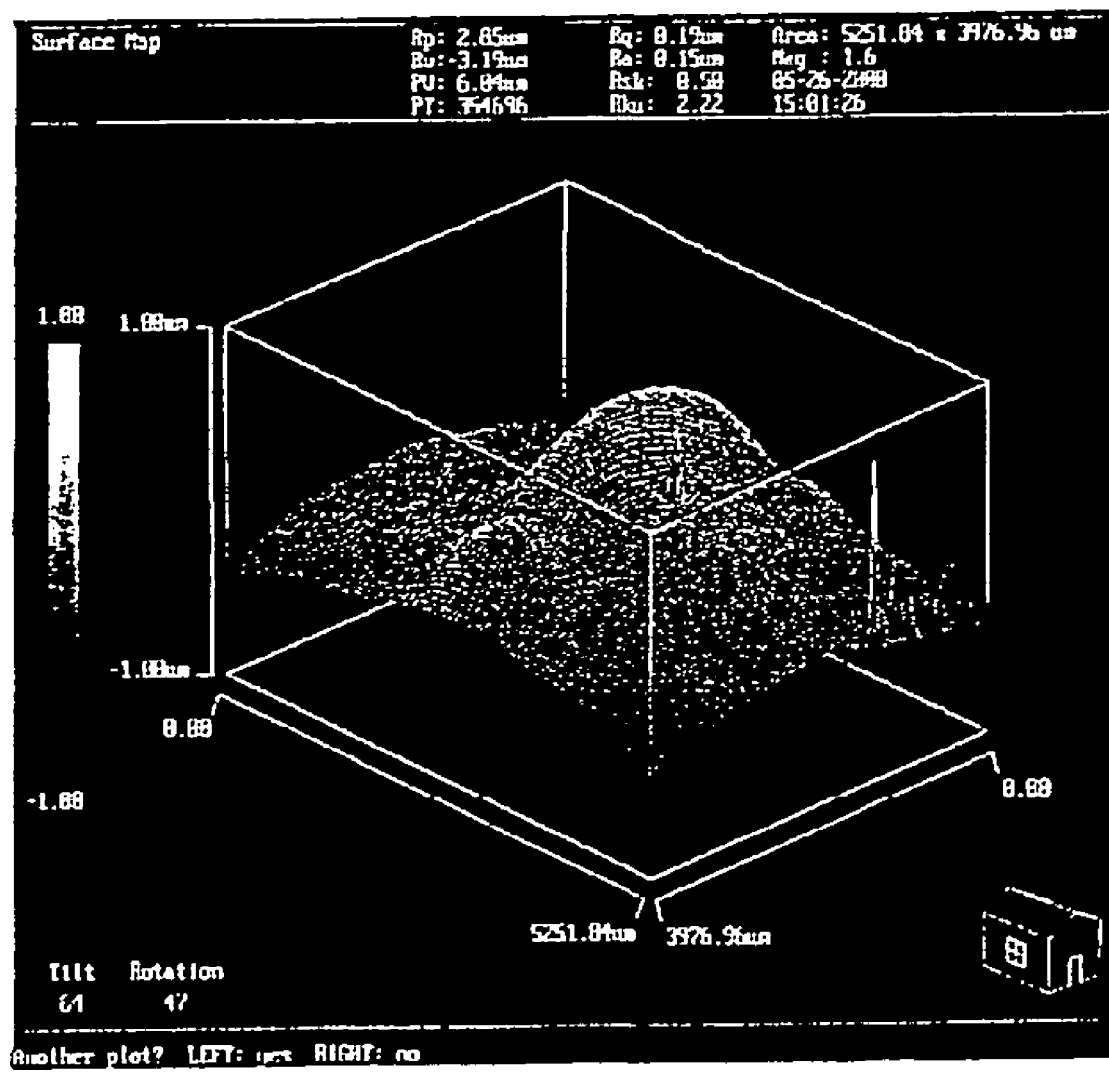

Using a stamper comprising a patterned managed heat transfer layer created with 5 pulse laser ablation, and 120 pulse laser ablation, a storage media, e.g., an optical disc, was molded. The laser ablation formed valley sections that were 40 mils (1.02 nun), 20 mils (0.51 mm), and 10 mils (0.25 mm) wide, with all of which being about 240 mils (6.10 mm) in length. The depth of the valleys was controlled by the number of pulses each valley section received from the excimer laser. Areas receiving 5 laser pulses had a depth of 0.4 micrometers, while areas receiving 120 pulses from the laser had a depth of 91 micrometers. Optical profilometer images of the features produced on the disc were analyzed using an ADE/Phase-Shift optical profilometer (e.g., a MicroXAM) FIG. 7 illustrates features produced by S pulse laser ablation pattern, while FIG. 8 illustrates features produced by 120 pulse laser ablation pattern. The larger features from the patient are easily observed with a naked eye. Some of the smaller features are visible only using a microscope, and the smallest features on the stamper were not replicated at all on the disc. That is, patterns may be large and easily visible to the naked eye, or may be microscopic, only detectable using specialized equipment.

For a typical compact disc, pit depth is about 50 nm to about 200 nm, with about 125 nm to about 175 nm generally preferred. Without the use of the secondary features, the pit depth is generally quite uniform over the whole disc surface, with the pit length optionally variable. Without the use of the secondary features, variation in the depth of the primary surface features or variation in the long-range surface topography of the stamper cannot be easily attained. The mastering processes used to define the feature size are not able to create features of differing depths or long-range, superimposed topography on the master surface. Consequently, employing the secondary features to vary the primary surface topography in a predetermined fashion (e.g., macroscopically or microscopically, for aesthetics or identification, with one or more sets of distinguishing features, and the like) enables source identification, by licensors and optionally by customers, without changing the depth of the primary surface features and/or inhibit their readability.

For antipiracy purposes, which are currently of great interest, the pattern to be transcribed to the disc provides a technique of detecting useful information, such as where and how the disc has been produced, or whether or not it conforms to copyright standards. For example, all discs produced by licensed manufacturers may be required to contain a particular pattern on the media surface for antipiracy purposes. In fact, it is very difficult to control the replication of media all around the world. However, by using the antipiracy technology disclosed herein, effective control and monitoring of the replication of the media can be easily performed. Also, additional features to represent an artwork on the media can be used for aesthetic purposes and as a distinguishing feature.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manufacturing a data storage media, comprising:
    disposing an identifier layer onto a surface of a stamper, said stamper having primary surface features on a first side of said stamper opposite said identifier layer, wherein said identifier layer is a managed heat transfer layer comprising a material selected from the group consisting of polyimide, polyamideimide, polyamide, polysulfone, polyethersulfone, polytetrafluoroethylene, polyetherketone, and blends, copolymers, mixtures, reaction products, and composites comprising at least one of the foregoing materials;
    forming secondary features on an exposed surface of said identifier layer;
    installing said stamper into a mold;
    injecting a molten plastic material into the mold, wherein said molten plastic material physically contacts said first side; and
    cooling said plastic material to form said data storage media, such that a positive image of said primary surface features and of said secondary features are formed into at least a portion of a surface of said plastic material.

2. The method of claim 1 further comprising forming said secondary features with a laser beam.

3. The method of claim 2, wherein said laser beam has wavelength of about 248 nm to about 308 nm.

4. The method of claim 1 further comprising forming said secondary features by a plasma etching.

5. The method of claim 1 further comprising forming said secondary features by photolithography.

6. The method of claim 1, wherein said plastic material comprises polyimides.

7. The method of claim 1 wherein said secondary features have valleys having a size equal to or greater than about 25 µm in valley width.

8. The method of claim 7, wherein said valley width is greater than or equal to about 30 µm.

9. The method of claim 8, wherein said valley width is greater than or equal to about 50 µm.

10. The method of claim 1 wherein said secondary valley features have peaks having a peak width of greater than or equal to about 1 µm.

11. The method of claim 10, wherein said peak width is greater than or equal to about 5 µm.

12. The method of claim 11, wherein said peak width is greater than or equal to about 10 µm.

13. The method of claim 1 further comprising spin coating said identifier layer onto said stamper.

14. The method of claim 1, wherein disposing said identifier layer onto said surface further comprises a method selected from the group consisting of bonding laminating, vapor deposition, spraying, sputtering, and combinations comprising at least one of the foregoing methods.

15. The method of claim 1, wherein disposing said identifier layer on said surface further comprises forming said identifier layer and laminating said identifier layer to said stamper.

16. The method of claim 1 wherein said secondary features have a depth of about 0.05 µm to about 5.0 µm.

17. The method of claim 1 wherein said secondary features have a depth of greater than or equal to about 5.0 µm.

* * * * *